April 7, 1931.    E. GEIGER    1,799,967
TREE EXTRACTOR
Filed Feb. 5, 1929
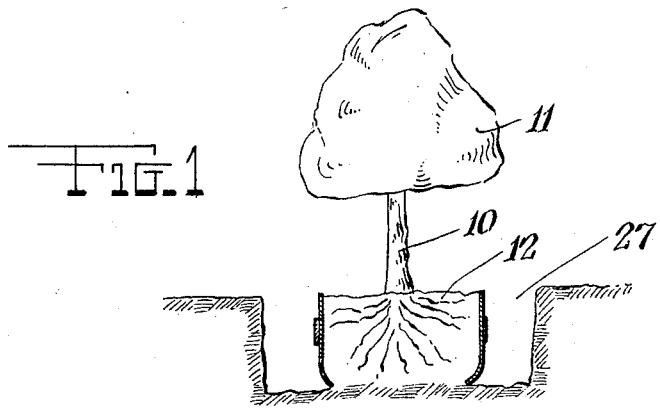
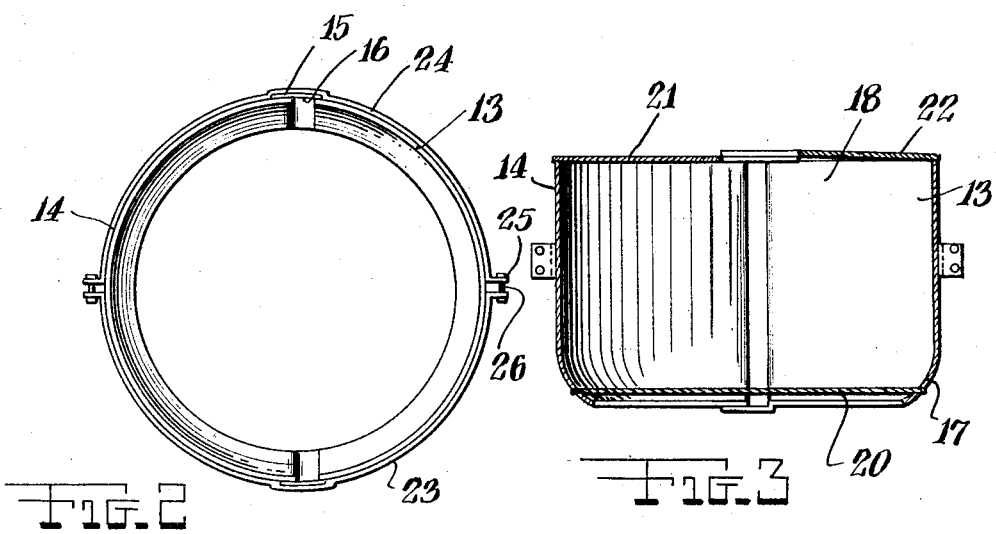
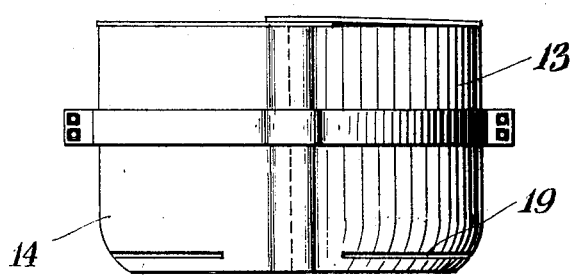
Inventor
E. Geiger
By his Attorney J. Ledermann Patented Apr. 7, 1931

1,799,967

UNITED STATES PATENT OFFICE

EUGENE GEIGER, OF ARMONK, NEW YORK

TREE EXTRACTOR

Application filed February 5, 1929. Serial No. 337,629.

The main object of this invention is to provide a device which permits the extracting of trees from first-growth soil to be replanted to other locations in such manner that the original soil will be enabled to cling to the roots.

Another object of this invention is to provide a cup or shell which is sunk into the growth after a circular trench has been excavated and fitted around the soil in which the roots of a tree grow so that this shell will compactly retain the original soil in order that the growth of the tree on replanting will not be retarded or arrested.

The above and other objects will become apparent in the description below, in which characters of reference refer to like-named parts in the drawing.

Referring briefly to the drawing, Figure 1 is a reduced sectional elevational view of the extractor cup, showing its application to the roots of a tree.

Figure 2 is an enlarged top plan view of the extractor cup.

Figure 3 is a longitudinal sectional elevational view of the extractor cup.

Figure 4 is an exterior longitudinal elevational view of the extractor cup.

Referring in detail to the drawing, the numeral 10 indicates the trunk of a tree having the usual foliage 11 at its upper end and its roots 12 embedded in the soil immediately beneath the trunk. These roots are encompassed by an extractor cup, consisting of two semi-circularly formed aprons 13 and 14. The ends of the apron 13 are enlarged or deformed radially outward into lips 15 which provide a recessed channel 16 in which is adjustably housed the ends of the apron 14. The lower marginal edges of the aprons 13 and 14 are curved inwardly, as illustrated by the numeral 17, to form a shoulder or ledge upon which the soil encompassed by the aprons is retained within the annular chamber 18 formed by the jointure of the aprons. Both of the aprons near their lower inwardly curved edges are provided with slits 19 into which a removable floor plate 20 is slid. The upper open edges of the aprons are covered by semi-circular over-lapping plates 21 and 22 which have semi-circular openings therein through which the trunk of the tree passes upwardly when the device is fitted around the roots of a trunk. The aprons are retained in circular conformation and adjustably so by a pair of semi-circular straps 23 and 24 which are deformed outwardly at the position where members 15 on the apron 14 occur. These straps have ears 25 extending radially outward therefrom which are connected by bolts 26 so that the volume of the chamber 18 may be varied to a pre-determined degree, depending entirely upon the space between the ears 25 which may be moved toward each other.

Nurserymen suffer a large loss annually when removing trees from their nurseries and replanting the same at other locations, owing to the fact that most of the soil originally clinging to the roots of the disinterred trees falls from place and when these roots of the trees are buried in fresh soil the growth of the trees is temporarily or permanently arrested as the environment may be different and the trees, as a general rule, die. This occurs because the roots do not extract enough nourishment from the fresh soil. To eliminate this danger I propose to provide a cup which is formed of two semi-circular aprons, such as 13 and 14. These aprons are fitted in place around the roots of a tree after a circular trench 27 has been dug around these roots. When the soil is soft enough the floor 20 may be slid through the slits 19, thus forming a support for the soil retained in the chamber 18. The extractor cup may be hauled from its place with the roots intact in the soil, undisturbed, and may be planted at a new location with the original soil. The straps permit the adjustment of the volume of the chamber 18 so that the soil contained in the extractor cup may be compactly carried therein by adjustment of the bolts 26 and their corresponding nuts.

It is to be noted that certain changes in form and construction may be made without departing from the spirit and scope of the invention.

I claim:

A device for extracting trees with the original soil clinging to the roots comprising a pair of independent semi-circular aprons forming a circular compartment, covers for enclosing the upper ends of said aprons, said aprons having their lower edges curved inwardly toward the axis, slits in said aprons, a floor adapted to be slid through said slits to support the soil in said compartment, a pair of rigid semicircular straps bounding said aprons retaining the same in circular conformation, and offset surfaces on one apron guiding the second apron into concentric conformation with the first-named apron.

In testimony whereof I affix my signature.

EUGENE GEIGER.